(No Model.)

L. H. GOODWIN.
DRIVING CHAIN OR BELT.

No. 279,742. Patented June 19, 1883.

Attest
Alfred B. Benedict
Theo A. Brühl

Inventor
Levi H. Goodwin
By Geo. J. Murray

UNITED STATES PATENT OFFICE.

LEVI H. GOODWIN, OF CINCINNATI, OHIO.

DRIVING CHAIN OR BELT.

SPECIFICATION forming part of Letters Patent No. 279,742, dated June 19, 1883.

Application filed March 7, 1883. (No model.)

*To all whom it may concern:*

Be it known that I, LEVI H. GOODWIN, a citizen of the United States, residing at Cincinnati, county of Hamilton, State of Ohio, have invented certain new and useful Improvements in Driving Chains or Belts, of which the following is a specification.

The invention relates particularly to endless chains or belts for transmitting power. Its object is a cheap medium for communicating motion, which can be readily put together in suitable lengths, and in case of wear or accidental breakage quickly repaired. This object is accomplished by the means illustrated in the accompanying drawings, in which—

Figure 1:
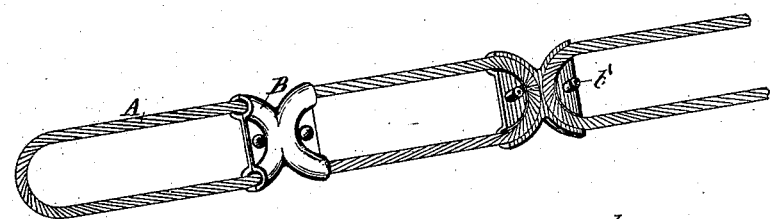
Figure 2:
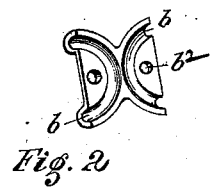
Figure 3:
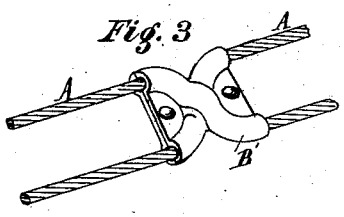
Figure 4:
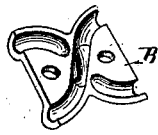
Figure 5:
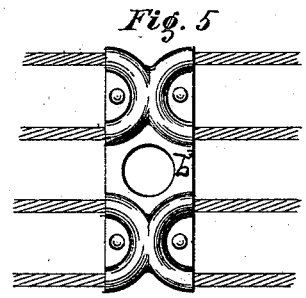

Figure 1 is a perspective view of a section of chain embodying my invention. Fig. 2 is a perspective view of one-half of one of the clip or coupling pieces, looking at the inside. The other half of this piece is shown in position on the links in Fig. 1. Fig. 3 shows a modified form of my invention. One-half of the clip-piece used in this form of my invention is illustrated in perspective in Fig. 4. This view, like Fig. 3, is looking at the inside of the clip. Fig. 5 illustrates a method of making a wide belt. In this view several strands or links of wire rope are united side by side by a broad clip, which consists of several single clips united or cast in one piece.

In Fig. 1, A represents links of wire, cord, or rope united by clamps B, which are made preferably of malleable cast-iron. The clips are cast in halves, each half having annular grooves $b$, semicircular in cross-section, to receive the rounded ends of the links A. Upon one side of the clip are cast pins $b'$, which are to enter holes $b^2$ in the opposite side, and project a sufficient distance through the holes to admit of the ends being riveted to secure the halves together. The outer ends of the grooves $b$ are oval and the edges rounded off, so as to permit the chains to turn around a small sprocket-wheel without cutting or injuring the links.

The links may be made endless or formed from pieces cut from a wire cable by brazing or soldering the ends together. In the latter case a depression in the groove in each half of clip B should be made large enough to admit jointed end of the link, which should come in the center of the clip.

In the form shown in Fig. 3, instead of the chain being formed of separate links A, it is formed of a single strand or two strands of wire cord, which are lapped across each other in the center of the clip B'. Each side of the clip-piece B has a depression in the center of the groove. The strands A' are forced into these depressions when the halves of the clip are riveted together, thus locking the clip against slipping. It is evident that in this form of my invention a cable-belt of any desired length may be made of a single wire cord, as follows: The wire cable is doubled in the middle. Then at regular distances apart, commencing from the doubled end, the cable is crossed and clips B' secured over it. The free ends of the cable are united in any suitable manner, and the two ends of the cable-belt united by the clip B. It is also evident that, instead of crossing the cable, the grooves in the clips could be given a short curve, so as to bring the opposite cables together, or nearly so, near the center of the clip; but it is believed this method is not so desirable where heavy duty is required, as the coupling-clip would be liable to slip.

In the form shown in Fig. 5 either form of coupling-clip may be adopted, and the web $b^3$, uniting two or more of the clips, may be left plain or perforated to engage pins upon a sprocket-wheel. In making sprocket-wheels for my cable-belt I prefer to make depressions in the periphery counter to the coupling-clips B or B' in addition to the projections which engage the edges of the clip. These depressions should be deep enough to let the cable-links rest upon the periphery of the wheel and relieve the clips from the strain.

It is intended to make and sell the coupling-clips and links A separately, so that any one can readily make a belt of any length desired, and quickly repair the belts should any part give way.

It would of course be a mere modification of my invention to omit the coupling pin or rivet $b'$ and unite the two halves of the clip by separate rivets or bolts.

It is also evident that the form of the clip may be changed without departing from the principle of my invention, the essential features of the clip being to unite or clamp the cable-belt at intervals of its length, and to engage with the teeth of a sprocket-wheel to transmit power.

What I claim as new, and desire to secure by Letters Patent, is—

1. The two-part coupling-clip B for cable belts or chains, having depressions $b$ to receive the cable, and suitable means—such as rivets $b'$—for uniting the parts together.

2. As a new article of manufacture, the cable-chain consisting of links A and clips B for uniting the links together, substantially as specified.

LEVI H. GOODWIN.

Witnesses:
 ALFRED B. BENEDICT,
 CHAS. F. GESSERT.